Figure 1:
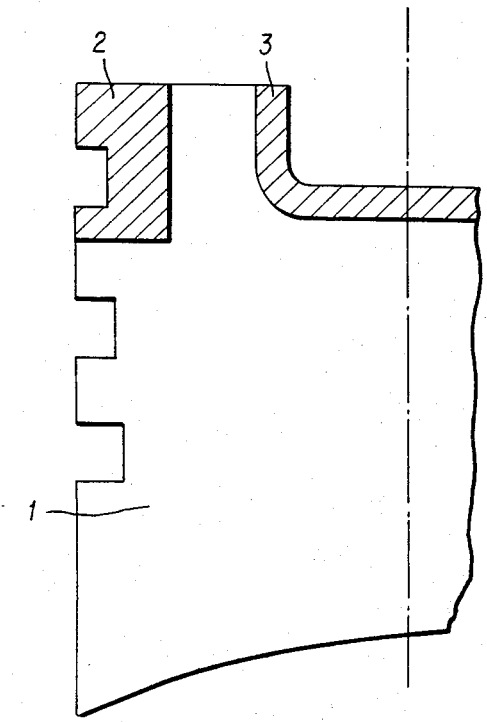

United States Patent [19]

Huret et al.

[11] Patent Number: 4,537,161

[45] Date of Patent: Aug. 27, 1985

[54] INSERTS FOR PISTONS OF DIESEL ENGINES OF ALUMINUM-SILICON ALLOYS HAVING AN IMPROVED THERMAL RESISTANCE AND MACHINABILITY

[75] Inventors: Noel Huret, Noisy-le-Grand; Jean Meunier, Grenoble, both of France

[73] Assignee: Cegedur Societe de Transformation de l'Aluminium Pechiney, Paris, France

[21] Appl. No.: 558,296

[22] Filed: Dec. 5, 1983

[30] Foreign Application Priority Data

Dec. 8, 1982 [FR] France .............................. 82 20892

[51] Int. Cl.³ ........................ C22C 21/04; C22F 1/04; F02F 3/04
[52] U.S. Cl. ............................ 123/41.71; 123/193 P; 123/668
[58] Field of Search .............. 123/193 P, 41.35, 41.52, 123/41.71, 668

[56] References Cited

U.S. PATENT DOCUMENTS

| | | | |
|---|---|---|---|
| 3,868,250 | 2/1975 | Zimmermann | 148/3 |
| 4,364,159 | 12/1982 | Holcombe | 123/193 P |
| 4,432,313 | 2/1984 | Matlock | 123/193 P |
| 4,434,014 | 2/1984 | Smith | 148/3 |

Primary Examiner—Craig R. Feinberg
Assistant Examiner—David A. Okonsky
Attorney, Agent, or Firm—Oblon, Fisher, Spivak, McClelland & Maier

[57] ABSTRACT

This invention relates to inserts for pistons of diesel engines of aluminum-silicon alloys obtained by powder metallurgy.

These inserts are characterized in that they contain elements such as iron and zirconium.

They find their application in the manufacture of pistons intended to work at high temperatures for long periods and exhibit a good friction capacity.

3 Claims, 3 Drawing Figures

INSERTS FOR PISTONS OF DIESEL ENGINES OF ALUMINUM-SILICON ALLOYS HAVING AN IMPROVED THERMAL RESISTANCE AND MACHINABILITY

This invention relates to inserts for pistons of diesel engines of aluminum-silicon alloys containing 12 to 25% of silicon obtained by powder metallurgy and having both an improved thermal resistance and machinability, as well as a good friction capacity.

It is well known that, in automobile manufacturing, the designers, through concern for fuel economy, are turning more and more to the use of lightweight materials. Thus, each day aluminum and its alloys take a larger place to the detriment of the much denser ferrous materials.

With reference to the engine in particular, it is now common to resort to aluminum-silicon alloys for the making of parts subjected to friction such as the sleeves and the pistons, because it is known that silicon is an element which posseses a very great resistance to wear. These alloys generally contain other elements such as copper, magnesium, nickel, cobalt which contribute to improving some of their mechanical characteristics and/or lubricants: graphite, molybdenum disulfide, for example.

But, the current trend of the DIESEL designers in particular is to increase the specific ratings of the engines, so that the materials which make them up are exposed to higher and higher thermal stresses. That is the case in particular with some added parts or inserts which equip the pistons to constitute either the throat of the firing ring and the upper edge of the piston, or the combustion chamber and whose temperature can reach 400° C.

Under these conditions, it turns out that the aluminum-silicon alloys such as A-S12UNs, A-S18UNGs, A-22UNKs used successfully until then to make these inserts exhibit a reduced mechanical resistance which, by degradation over time, becomes insufficient.

To eliminate this drawback without being deprived of the undeniable advantage of lightness and friction capacity that the aluminum-silicon alloys provide, the applicant has studied and found that it was possible to improve their thermal resistance by incorporating some iron into it provided that the precipitations of phases to which it gives rise are fine and homogeneous.

FIG. 1 reflects the application of this invention to piston inserts, illustrating a section through a plane passing through the axis of a half-piston in the mass of which are placed inserts of the alloy of the invention.

Figure 2:
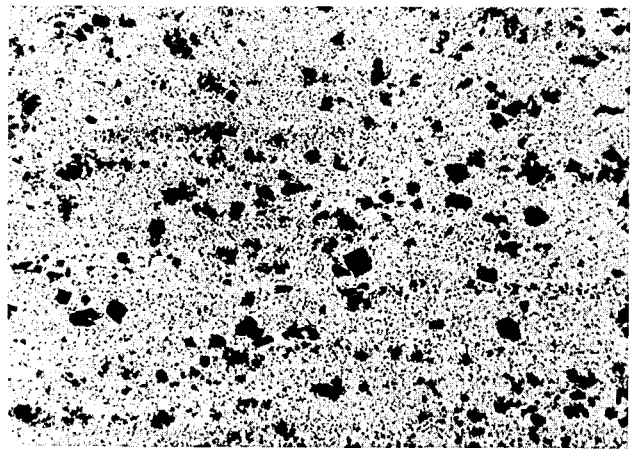
Figure 3:
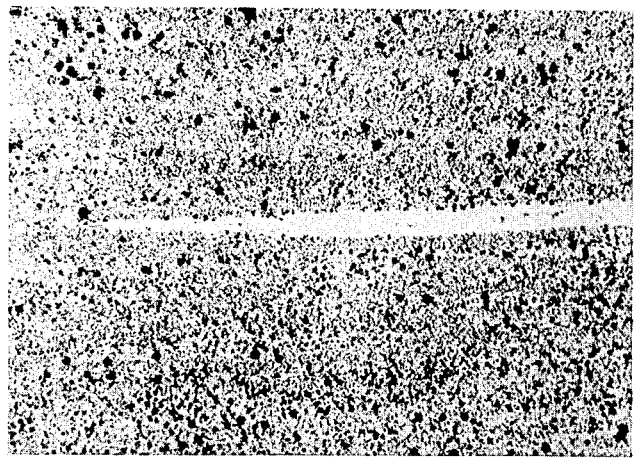

FIGS. 2 and 3 are photomicrographs, under a magnification of 400, of alloy samples within the claimed invention.

Specifying the conditions for obtaining these alloys, the applicant found that a concentration of iron of 2 to 8% by weight constituted an optimum because a greater amount does not bring about a significant improvement, while less than 2% causes little effect on the thermal resistance.

To achieve the desired fineness and homogeneity of the precipitates, the applicant was induced, because of the low solubility of iron in aluminum, to resort to quick solidification processes, i.e., those which are based on obtaining metal in the divided state and that are generally grouped under the name of powder metallurgy.

Thus the aluminum-silicon alloy to which a suitable amount of iron has been added previously is melted and brought to a temperature higher than 900° C. so as to avoid any premature precipitation phenomenon, then treated in suitable devices which assure its division into particles. The latter can be performed by fine spraying obtained by atomization using a gas, or by mechanical atomization followed by a solidification in a gas (air, helium, argon). Thus, powders with a granulometry less than 400 μm are obtained. But the solidification can also be done at speeds higher than in the case of atomization by spraying of the molten alloy against a cold metal surface, resulting in the formation of grains with a thickness less than 100 μ. The particles thus made are then hot and/or cold pressed then drawn or forged hot so as to obtain the alloy in the compact state from which the inserts are made.

By closely examining the measurements of thermal resistance of the alloys thus prepared, the applicant has found certain disparities which have allowed him to show the influence of the granulometry and the thickness of the particles on the fineness of the precipitates and, consequently, on the thermal mechanical resistance. Actually, the greater the cooling speed, the smaller or thinner are the particles and their specific surface developed and, consequently, the more the fineness of the precipitates increases. Moreover, this relation has been verified by a micrographic examination. Consequently, depending on the degree of improvement of the thermal resistance that it is desired to achieve, the particles are selected by carrying out a granulometric cutting or by acting on the cooling speed.

Continuing his study on the role played by the particles, the applicant also showed that for hypereutectic alloys, the size of the primary silicon grains evolves also in the same direction as the dimensions of the particles, i.e., the smaller the particles are, the smaller also are the silicon grains. Now, it is known that the machinability of the aluminum-silicon alloys increases with the fineness of the primary silicon grains.

Thus, this invention simultaneously contributes to improving the thermal resistance and the machinability of the manufactured alloys.

Under these conditions, the piston inserts obtained by powder metallurgy exhibit a resistance to temperatures between 350° and 400° C., clearly higher than that observed with alloys made by casting, such as for example, A-U6MT selected because of its remarkable performances from the viewpoint of its heat resistance.

The applicant, having succeeded in significantly improving the thermal resistance of the aluminum-silicon alloys by an addition of iron, has also found that this effect could be heightened by adding also some zirconium, but in an amount much lower than the iron. Thus, concentrations by weight between 0.2 and 1.5% proved to be the most effective.

An alloy according to the invention, in which these two elements figure, has in particular as a property of exhibiting a thermal resistance which virtually does not evolve over time, even after being kept 500 hours at 350° C.

Moreover, other elements with low solubility and diffusivity in aluminum such as nickel, cobalt, cerium, molybdenum, chromium, titanium, vanadium, for example, have a favorable influence on the desired properties and can be used either by replacing zirconium, or in combination with zirconium at concentrations by weight not exceeding 2% for each one of them.

The invention can be illustrated by the following application example: an alloy ingot of the type A-S25UN G Fe$_3$Zr, with the following composition by weight:

Fe—2.80%
Si—22.10%
Cu—1.07%
Ni—1.05%
Zr—0.59%
Mg—0.80% was melted and atomized into the air at a temperature between 950° C. and 1000° C. A powder was collected of which at least 90% of the mass had a granulometry lower than 400 μm and which exhibited upon micrographic examination a much more homogeneous and finer structure than in the case of the casting.

This powder was separated into two batches with a granulometry of 400–180 μm and 63–20 μm that were separately pressed cold in billets in the 95-mm diameter container of a press. These billets were thermally treated, then drawn hot in a temperature range in the vicinity of 350° C., cut and machined, to provide the inserts according to the invention which can be illustrated by FIG. 1 attached to this invention.

FIG. 1 exhibits a section through a plane passing through the axis of a half-piston (1) in the mass of which are placed inserts (2) forming the throat of the firing ring and the upper edge of the piston and (3) forming the combustion chamber.

These inserts were subjected to micrographic examinations and to friction, machinability and stress tests.

The micrographic examinations, under a magnification of 400, are shown by the photos corresponding to FIGS. 2 and 3 which accompany this application. There can be seen in FIG. 2 a product obtained from the powder with a granulometry of 400–180 μm, in which primary silicon particles appear whose dimensions are less than 10 μm, on the other hand, in FIG. 3, relative to the 63–20 μm powder, these particles are finer and have dimensions less than 5 μm. Examinations with an electron microscope also show a greater fineness of the phases rich in iron in the case of the 63–20 μm powder.

The unnumbered machinability tests here confirm the beneficial effect of the powders with fine granulometry on the possibilities of machinability of the alloy.

The friction tests also show that the friction capacity of these alloys with heat is improved by the addition of iron and/or zirconium and/or other elements.

Stress tests were performed in the long direction and a 350° C. on the products kept for one hour and five hundred hours, respectively, at this temperature, and in both cases both the yield strength at 0.2%: R 0.2 and the maximum resistance: Rm was measured. At the same time, for comparison, the same measurements were made on an A-U6MT alloy worked by casting, then drawing which is known to have a remarkable thermal resistance.

The following table gives an account of these tests:

| | | Processing temperature: 350° C. | | | |
|---|---|---|---|---|---|
| | | Operation: 1 hr | | Operation: 500 hrs | |
| Alloy | Granulometry in μm | R 0.2 MPa | Rm MPa | R 0.2 MPa | Rm MPa |
| A-S25UN G Fe$_3$ZrO.6 | 450–180 | 55 | 92 | 71 | 93 |
| | 63–20 | 76 | 107 | 81 | 113 |
| A-U6MT | cast | 79 | 111 | 36 | 58 |

It is found that the alloy according to the invention has a thermal resistance after an operation of one hour at 350° C. comparable with that of the A-U6MT. This resistance does not diminish during a prolonged operation at this temperature for five hundred hours whereas, on the other hand, the resistance of the A-U6MT is reduced by half.

This table also shows that the resistance is better when the powder used has a finer granulometry.

This invention finds its application in the manufacture, under better conditions of machinability, of inserts for pistons of engines intended to work at high temperatures for long periods and that have both an improved and stable resistance over time, and a good friction capacity. It is especially well suited to pistons of DIESEL engines.

We claim:

1. Inserts for pistons of DIESEL engines, said inserts comprised of aluminum-silicon alloys containing 12 to 25% silicon, obtained by powder metallurgy and having both an improved thermal resistance and machinability, as well as a good friction capacity, characterized in that they contain between 2 and 8% by weight of iron and 0.2–1.5% by weight of zirconium.

2. Inserts as in claim 1, wherein they contain at least an element belonging to the group consisting of cerium, molybdenum, chromium, nickel, titanium, vanadium and cobalt.

3. Inserts as in claim 2, wherein they contain at least 2% by weight of each of these elements.

* * * * *